(12) United States Patent
Schaefer et al.

(10) Patent No.: US 6,844,992 B2
(45) Date of Patent: Jan. 18, 2005

(54) OPTO-MECHANICAL PLATFORM

(75) Inventors: Thomas A. Schaefer, Groveland, MA (US); Gregory G. Cappiello, Windham, NH (US); Ninghui Zhu, Winchester, MA (US); Kurt E. Abdelmaseh, Worcester, MA (US); Evgueni V. Babenko, Manchester, NH (US); William J. Hubbard, Litchfield, NH (US); Kevin J. McIntyre, Derry, NH (US); Brian J. McKeen, Bow, NH (US); Paul Ouellette, North Andover, MA (US); Andrew Radl, Dunbarton, NH (US); Dick Rolfe, Biddeford, ME (US)

(73) Assignee: Confluent Photonics Corporation, Salem, NH (US)

( * ) Notice: Subject to any disclaimer, the term of this patent is extended or adjusted under 35 U.S.C. 154(b) by 0 days.

(21) Appl. No.: 10/390,176

(22) Filed: Mar. 18, 2003

(65) Prior Publication Data

US 2003/0179472 A1 Sep. 25, 2003

Related U.S. Application Data

(60) Provisional application No. 60/364,635, filed on Mar. 18, 2002.

(51) Int. Cl.[7] ............................................... G02B 7/02
(52) U.S. Cl. .................... 359/820; 359/821; 359/822; 359/823
(58) Field of Search .................................. 359/820, 819, 359/821, 822, 823, 127, 129, 130, 131, 808, 811, 813; 385/52, 88, 70, 91, 93

(56) References Cited

U.S. PATENT DOCUMENTS

| | | | | |
|---|---|---|---|---|
| 4,181,401 | A | * 1/1980 | Jensen | 385/62 |
| 6,307,657 | B1 | * 10/2001 | Ford | 398/9 |
| 6,490,303 | B1 | * 12/2002 | Komiyama et al. | 372/43 |
| 6,522,486 | B2 | * 2/2003 | Furuhashi et al. | 359/819 |
| 6,570,652 | B1 | * 5/2003 | Cappiello | 356/328 |
| 6,594,092 | B2 | * 7/2003 | von Freyhold et al. | 359/819 |
| 6,621,958 | B1 | * 9/2003 | Dueck et al. | 385/37 |
| 2003/0011769 | A1 | * 1/2003 | Rakuljic et al. | 356/328 |
| 2003/0026557 | A1 | * 2/2003 | Galeotti et al. | 385/94 |

* cited by examiner

Primary Examiner—Ricky Mack
Assistant Examiner—Brandi Thomas
(74) Attorney, Agent, or Firm—Hunton & Williams LLP

(57) ABSTRACT

An opto-mechanical platform for supporting truncated optical elements having at least one substantially flat side surface is disclosed. In one particular exemplary embodiment, the opto-mechanical platform may be realized as an apparatus for supporting truncated optical elements having at least one substantially flat side surface. Such an apparatus may comprise a platform having a substantially flat surface area for supporting the substantially flat side surface of the truncated optical elements. Such an apparatus may also comprise at least one substantially vertical wall formed on at least a portion of the platform for providing mechanical rigidity to the platform.

20 Claims, 2 Drawing Sheets

OPTO-MECHANICAL PLATFORM

CROSS-REFERENCE TO RELATED APPLICATIONS

This patent application claims priority to U.S. Provisional Patent Application No. 60/364,635, filed Mar. 18, 2002, which is hereby incorporated by reference herein in its entirety.

FIELD OF THE INVENTION

The present invention relates generally to optical component packaging and, more particularly, to an opto-mechanical platform for supporting truncated optical elements having at least one substantially flat side surface.

BACKGROUND OF THE INVENTION

Providing a stable opto-mechanical platform with a reduced overall package size is generally a requirement for optical telecommunications modules. These requirements apply to diffraction grating-based optical modules such as, for example, Dense Wavelength Division Multiplexer (DWDM) modules and Optical Performance Monitor (OPM) modules. In addition, these modules must provide acceptable optical performance over a specified operating temperature range (e.g., −5° C. to 70° C.). These modules must also generally withstand storage temperatures (e.g., −40° C.) to 85° C.) for extended periods of time.

One method to help achieve this so-called athermal performance is to make use of a cylindrical opto-mechanical geometry. That is, a module may be cylindrical in shape, with the cylindrical axis coincident with an optical axis of resident optical elements, similar to a lens barrel. The cylindrical geometry provides more mechanical stiffness relative to other geometries, thus improving the mechanical stability of the module. However, the cylindrical geometry may also increase the size of the module unnecessarily since the clear aperture of the optical elements within such a module is generally elliptical, with the long axis corresponding to the dispersion axis.

In view of the foregoing, it would be desirable to provide an opto-mechanical platform which overcomes the above-described inadequacies and shortcomings in an efficient and cost effective manner.

SUMMARY OF THE INVENTION

According to the present invention, an opto-mechanical platform for supporting truncated optical elements having at least one substantially flat side surface is provided. In one particular exemplary embodiment, the opto-mechanical platform may be realized as an apparatus for supporting truncated optical elements having at least one substantially flat side surface. Such an apparatus may comprise a platform having a substantially flat surface area for supporting the substantially flat side surface of the truncated optical elements. Such an apparatus may also comprise at least one substantially vertical wall formed on at least a portion of the platform for providing mechanical rigidity to the platform.

In accordance with other aspects of this particular exemplary embodiment of the present invention, the at least one substantially vertical wall may beneficially be attached to the platform so as to reduce bending or warping of the platform. In such a case, the platform and the at least one substantially vertical wall may each beneficially be formed of a metallic, ceramic, plastic, and/or composite material.

In accordance with further aspects of this particular exemplary embodiment of the present invention, the at least one substantially vertical wall may beneficially be integrated with the platform so as to reduce bending or warping of the platform. In such a case, the integrated platform and substantially vertical wall may beneficially be machined from a single piece of material or molded using one or more material types. In either case, the material may be a metallic, ceramic, plastic, and/or composite material.

In accordance with additional aspects of this particular exemplary embodiment of the present invention, the at least one substantially vertical wall may beneficially be formed around at least a portion of an outer perimeter of the platform. Thus, the at least one substantially vertical wall may beneficially substantially enclose the truncated optical elements therein. Alternatively, the at least one substantially vertical wall may beneficially be formed at one or more locations within an outer perimeter of the platform. In either case, the height of the at least one substantially vertical wall may beneficially coincide with the height of the truncated optical elements.

In accordance with still other aspects of this particular exemplary embodiment of the present invention, the truncated optical elements may beneficially be attached to the platform using an adhesive material that accommodates the thermal expansion rates of both the truncated optical elements and the platform. Also, the truncated optical elements may beneficially be attached to the platform using intermediate mounting means disposed therebetween that accommodates the thermal expansion rates of both the truncated optical elements and the platform. In some embodiments, the platform may beneficially comprise mounting means formed therein for supporting the attachment of the truncated optical elements to the platform.

In accordance with still further aspects of this particular exemplary embodiment of the present invention, the truncated optical elements may beneficially be positioned on the platform using an alignment jig. The truncated optical elements may beneficially comprise optical lenses, an optical fiber mounting assembly, an optical diffraction grating, an optical prism, and/or an optical detector.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
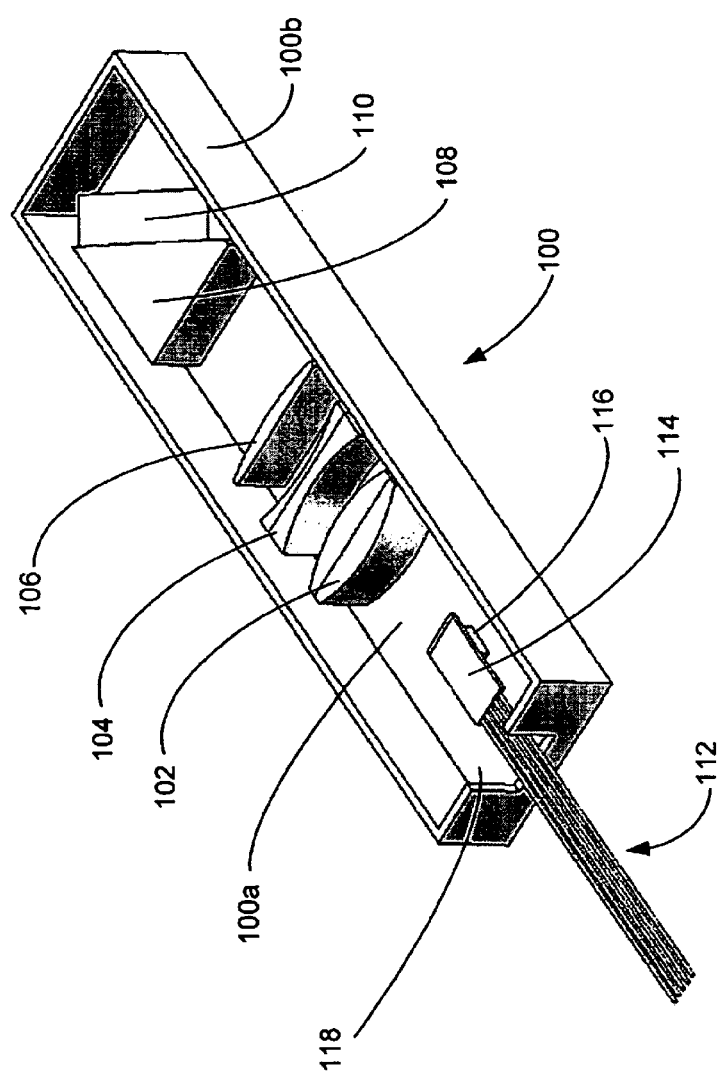
FIG. 1 is a perspective view of an opto-mechanical platform in accordance with the present invention.

Referring to FIG. 1, there is shown a perspective view of an opto-mechanical platform 100 in accordance with the present invention. The opto-mechanical platform 100 comprises a base portion 100a having a substantially flat surface area upon which a plurality of truncated optical elements 102–110 are mounted so as to reduce the overall size of the opto-mechanical platform 100. That is, the opto-mechanical platform 100 supports the plurality of optical elements 102–110 that have been truncated (i.e., formed having at least one flat side surface) so as to remove any substantially unused aperture or portion thereof. Such a configuration results in an opto-mechanical mounting scheme that is drastically different than that for an optical module having a cylindrical geometry. Thus, the present invention provides a novel opto-mechanical mounting scheme for mounting truncated optical elements which provides for a reduced overall package size, as well as providing excellent thermal and mechanical stability, as will be described in more detail below. The present invention also provides a method for assembling the truncated optical elements 102–110 on the opto-mechanical platform 100, as will also be described in more detail below.

As mentioned above, the opto-mechanical platform 100 comprises base portion 100a having a substantially flat surface area upon which the plurality of truncated optical elements 102–110 are mounted. While the base portion 100a is shown in FIG. 1 as being rectangular in shape, the present invention is not limited in this regard. For example, the opto-mechanical platform 100 may comprise a base portion having a substantially flat surface area which has a shape that conforms to the width of the truncated optical elements 102–110 or to the dimensions of a mounting chassis (not shown).

The opto-mechanical platform 100 also comprises vertical walls 100b formed around the outer perimeter of the base portion 100a. These vertical walls 100b provide mechanical rigidity to the opto-mechanical platform 100 by reducing bending and/or warping of the opto-mechanical platform 100, thereby reducing undesirable effects such as, for example, changes in insertion loss or wavelength centering. While the vertical walls 100b are shown in FIG. 1 as being formed around the outer perimeter of the base portion 100a, the present invention is not limited in this regard. For example, the vertical walls 100b may comprise any substantially vertical wall structure formed on the base portion 100a in any variety of positions. For instance, one or more substantially vertical wall structures could be formed in various locations on the base portion 100a so as to reduce bending and/or warping of the opto-mechanical platform 100.

The vertical walls 100b may be attached to the base portion 100a using adhesives or mechanical means (e.g., screws). Alternatively, the entire opto-mechanical platform 100, including the base portion 100a and the vertical walls 100b, or any portion thereof, may be fabricated from a single piece of material. For example, the opto-mechanical platform 100 may be machined from a block of raw material or molded in some manner. Accordingly, the opto-mechanical platform 100 may be formed of a metallic, ceramic, plastic, and/or composite material.

The truncated optical elements 102–110 may be arranged on the opto-mechanical platform 100 to perform one of many optical signal processing operations. For example, truncated optical elements 102–110 comprise a first truncated lens system 102, a second truncated lens system 104, a third truncated lens system 106, a truncated prism 108, and a truncated diffraction grating 110 for performing a dense wavelength division multiplexing/demultiplexing operation on optical signals received from and transmitted to optical fibers 112 secured to an optical fiber mounting assembly 114, which is in turn secured to base portion 100a, in this case using a spacer 116. Other truncated optical elements may include, for example, a truncated optical detector for detecting optical presence/performance.

The truncated optical elements 102–110 are preferably specifically designed for the opto-mechanical platform 100, at least in terms of thermal expansion rates. That is, the truncated optical elements 102–110 must be carefully chosen to provide adequate optical performance over a specified operating temperature range (e.g., –5° C. to 70° C.) since the opto-mechanical platform 100 expands and contracts as temperature is varied. This expansion and contraction of the opto-mechanical platform 100 causes the physical distance between the truncated optical elements 102–110 to vary based on temperature variations and the coefficient of thermal expansion of the platform.

The interfaces between the truncated optical elements 102–110 and the opto-mechanical platform 100 must accommodate any difference in thermal expansion rates between the two materials involved. This accommodation may occur, for example, by means of an epoxy or metal bonding layer, which also serves to bond the truncated optical elements 102–110 to the opto-mechanical platform 100, or by other means such as mechanical flexures. The attachment schemes may include, but are not limited to, solid pads, grooved patterns, wells, solid flexures and thermally compensating solid pad assemblies.

Figure 2:
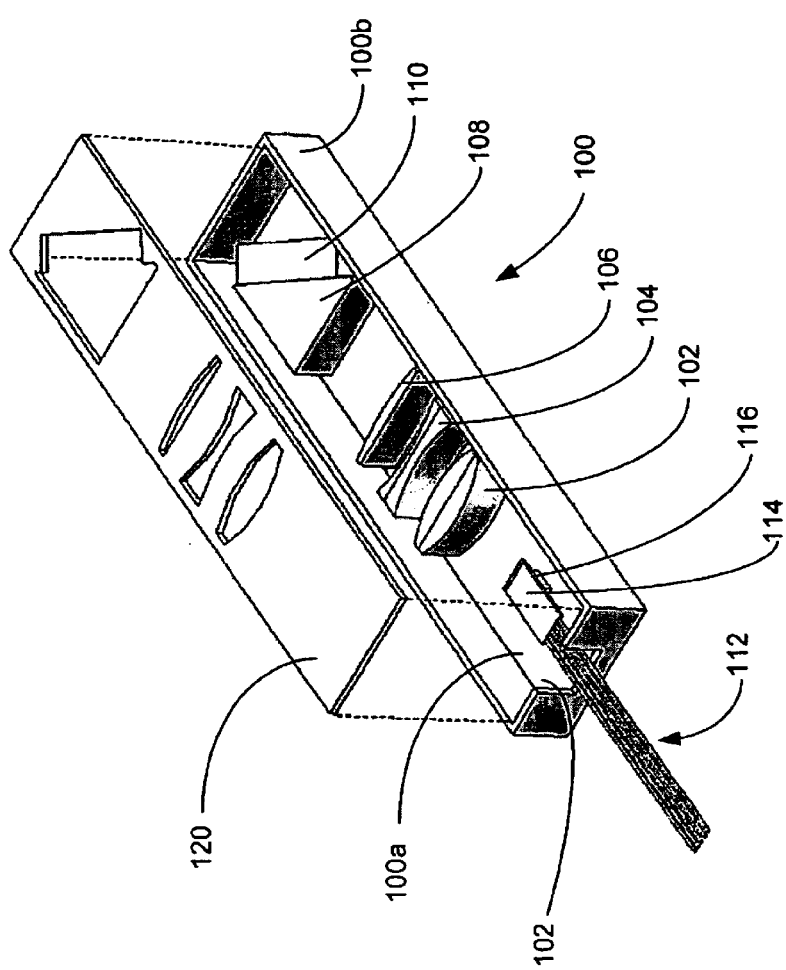
FIG. 2 is a perspective view of the opto-mechanical platform of FIG. 1 along with an alignment jig for aligning optical elements with the opto-mechanical platform in accordance with the present invention.

Referring to FIG. 2, the alignment of some or all of the truncated optical elements 102–110 may be achieved through the use of an alignment jig 120. The alignment jig 120 is positioned with respect to the opto-mechanical platform 100, and the truncated optical elements 102–110 are inserted into respective positions within the alignment jig 120. The truncated optical elements 102–110 may be banked up against reference surfaces of the alignment jig 120. With the truncated optical elements 102–110 in place, they may be bonded to the opto-mechanical platform 100 by bonding means such as, for example, epoxy or metal bonding materials. Once the truncated optical elements 102–110 are secured, the alignment jig 120 may be removed for use on another optical module.

Although not shown in FIG. 2, the above-mentioned optical fibers 112 and optical fiber mounting assembly 114 may also be aligned using the alignment jig 120. Also, as an alternative to the mounting scheme shown in FIGS. 1 and 2, the above-mentioned optical fibers 112 and optical fiber mounting assembly 114 may be secured to a plug (not shown) that is mounted in an opening 118 in the vertical walls 100b of the opto-mechanical platform 100. In either of the above-described mounting schemes, the affixing of the optical fibers 112 and optical fiber mounting assembly 114 (and the spacer 116 or plug (not shown)) to each and to the opto-mechanical platform 100 may be accomplished, for example, by means of epoxy or metal bonding layers. Both of these mounting schemes provide several degrees of freedom for an active alignment process that still results in relatively thin epoxy joints, which is a desirable feature. The degrees of freedom allow for lateral and longitudinal positioning of the optical fibers 112.

In summary, the present invention comprises an opto-mechanical platform for use in an optical system containing any number of truncated optical elements. The present invention opto-mechanical platform comprises a base portion and at least one substantially vertical wall formed along the sides and/or internally within the base portion to provide additional mechanical rigidity to the opto-mechanical platform. Many different embodiments are possible. For example, the present invention opto-mechanical platform may be employed in a system with nominally athermal performance, in a DWDM module, and/or in an OPM module. However, in all cases, a low profile, non-cylindrical optical package may be provided.

The present invention also comprises a method of aligning optical elements for attachment to an opto-mechanical platform using an alignment jig placed on or near the opto-mechanical platform, wherein the optical elements may be banked up against reference surfaces of the alignment jig.

The present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. An apparatus for supporting a plurality of truncated optical elements having at least one substantially flat side surface, each substantially flat side surface having a surface plane formed substantially parallel to an optical axis of the respective truncated optical elements, the apparatus comprising:
   a platform having a substantially flat surface area for supporting the substantially flat side surfaces of the plurality of truncated optical elements; and
   at least one substantially vertical wall formed on at least a portion of the platform for providing mechanical rigidity to the platform.

2. The apparatus of claim 1, wherein the at least one substantially vertical wall is attached to the platform so as to reduce bending or warping of the platform.

3. The apparatus of claim 1, wherein the platform is formed of one or more of a metallic, ceramic, plastic, and composite material.

4. The apparatus of claim 1, wherein the at least one substantially vertical wall is formed of one or more of a metallic, ceramic, plastic, and composite material.

5. The apparatus of claim 1, wherein the at least one substantially vertical wall is integrated with the platform so as to reduce bending or warping of the platform.

6. The apparatus of claim 5, wherein the integrated platform and substantially vertical wall are machined from a single piece of material.

7. The apparatus of claim 6, wherein the single piece of material is one or more of a metallic, ceramic, plastic, and composite material.

8. The apparatus of claim 5, wherein the integrated platform and substantially vertical wall are molded using one or more of a metallic, ceramic, plastic, and composite material.

9. The apparatus of claim 1, wherein the at least one substantially vertical wall is formed around at least a portion of an outer perimeter of the platform.

10. The apparatus of claim 9, wherein the at least one substantially vertical wall substantially encloses the plurality of truncated optical elements therein.

11. The apparatus of claim 1, wherein the at least one substantially vertical wall is formed at one or more locations within an outer perimeter of the platform.

12. The apparatus of claim 1, wherein the height of the at least one substantially vertical wall coincides with the height of the plurality of truncated optical elements.

13. The apparatus of claim 1, wherein at least some of the plurality of truncated optical elements are attached to the platform using an adhesive material that accommodates the thermal expansion rates of both the truncated optical elements and the platform.

14. The apparatus of claim 1, wherein at least some of the plurality of truncated optical elements are attached to the platform using intermediate mounting means disposed therebetween that accommodates the thermal expansion rates of both the truncated optical elements and the platform.

15. The apparatus of claim 1, wherein the platform comprises mounting means formed therein for supporting the attachment of at least some of the plurality of truncated optical elements to the platform.

16. The apparatus of claim 1, wherein at least some of the plurality of truncated optical elements are positioned on the platform using an alignment jig.

17. The apparatus of claim 1, wherein the plurality of truncated optical elements comprise optical lenses.

18. The apparatus of claim 17, wherein the plurality of truncated optical elements further comprise an optical fiber mounting assembly.

19. The apparatus of claim 17, wherein the plurality of truncated optical elements further comprise an optical diffraction grating.

20. The apparatus of claim 17, wherein the plurality of truncated optical elements further comprise an optical prism.

* * * * *